(12) United States Patent
Casari et al.

(10) Patent No.: US 12,384,566 B2
(45) Date of Patent: Aug. 12, 2025

(54) DRONE CHASSIS

(71) Applicants: NANTES UNIVERSITE, Nantes (FR); BEE TECH, Nantes (FR)

(72) Inventors: Pascal Casari, Saint-Nazaire (FR); Thibault Berthiau, Vigneux de Bretagne (FR); Antoine Trichereau, Nantes (FR)

(73) Assignees: NANTES UNIVERSITE, Nantes (FR); BEE TECH, Nantes (FR)

( * ) Notice: Subject to any disclaimer, the term of this patent is extended or adjusted under 35 U.S.C. 154(b) by 87 days.

(21) Appl. No.: 17/919,493

(22) PCT Filed: Apr. 14, 2021

(86) PCT No.: PCT/EP2021/059620
§ 371 (c)(1),
(2) Date: Oct. 17, 2022

(87) PCT Pub. No.: WO2021/209483
PCT Pub. Date: Oct. 21, 2021

(65) Prior Publication Data
US 2023/0192329 A1 Jun. 22, 2023

(30) Foreign Application Priority Data

Apr. 17, 2020 (FR) .................................... 2003869

(51) Int. Cl.
*B64U 20/73* (2023.01)
*B64U 10/14* (2023.01)
*B64U 20/70* (2023.01)

(52) U.S. Cl.
CPC ............. *B64U 20/73* (2023.01); *B64U 20/70* (2023.01); *B64U 10/14* (2023.01)

(58) Field of Classification Search
CPC ........ B64U 20/73; B64U 20/70; B64U 10/10; B64C 39/024
See application file for complete search history.

(56) References Cited

U.S. PATENT DOCUMENTS 9,840,339 B1 * 12/2017 O'Brien ................ B64C 39/024
9,908,619 B1 * 3/2018 Beckman ............... B64U 40/20
(Continued)

FOREIGN PATENT DOCUMENTS

| WO | 98/15429 A1 | 4/1998 |
| WO | 2014/198774 A1 | 12/2014 |
| WO | 2018/156991 A1 | 8/2018 |

OTHER PUBLICATIONS

Jun. 18, 2021 International Search Report issued in International Patent Application No. PCT/EP2021/059620.

*Primary Examiner* — Joshua J Michener
*Assistant Examiner* — Cindi M Curry
(74) *Attorney, Agent, or Firm* — Williams Mullen; R. Brian Drozd

(57) ABSTRACT

A drone chassis including an external structure that deforms elastically in bending, and a set of cables connecting at least one support, intended to support a functional element of the drone, to the external structure. The set of cables includes elastic cables deforming elastically in traction under a tensile stress above a natural deformation threshold, the set of cables being attached at several points on the external structure, referred to as attachment points, to hold the at least one support in a stable position with respect to the external structure. The elastic cables are attached under stress by applying an initial tensile stress and maintains the initial tensile stress by attaching to the external structure. An additional tensile stress applied to the cables attached under (Continued)

stress causes a deformation under traction of the cables only as from a threshold that is above the natural deformation threshold of the cables.

14 Claims, 4 Drawing Sheets

(56) References Cited

U.S. PATENT DOCUMENTS

| | | | |
|---|---|---|---|
| 2016/0280359 A1* | 9/2016 | Semke | B64U 60/60 |
| 2016/0375983 A1 | 12/2016 | Yan et al. | |
| 2017/0050726 A1* | 2/2017 | Yamada | B64U 60/60 |
| 2017/0291697 A1* | 10/2017 | Kornatowski | B64C 39/024 |
| 2017/0297681 A1* | 10/2017 | Yamada | B64U 30/299 |
| 2017/0329034 A1 | 11/2017 | Miles et al. | |
| 2017/0334579 A1* | 11/2017 | Hartkop | B64U 10/14 |
| 2018/0057135 A1* | 3/2018 | Yan | B64C 1/08 |
| 2018/0224262 A1* | 8/2018 | Klein | B64U 20/10 |
| 2020/0277054 A1* | 9/2020 | Lee | B64U 10/16 |
| 2021/0155346 A1* | 5/2021 | Liarokapis | B64U 30/20 |
| 2021/0237897 A1* | 8/2021 | Gury | G05D 1/102 |
| 2022/0380044 A1* | 12/2022 | Arnold | B64D 47/08 |
| 2022/0396369 A1* | 12/2022 | Hartkop | B64U 20/87 |
| 2023/0192329 A1* | 6/2023 | Casari | B64U 20/73 |
| | | | 244/121 |

* cited by examiner

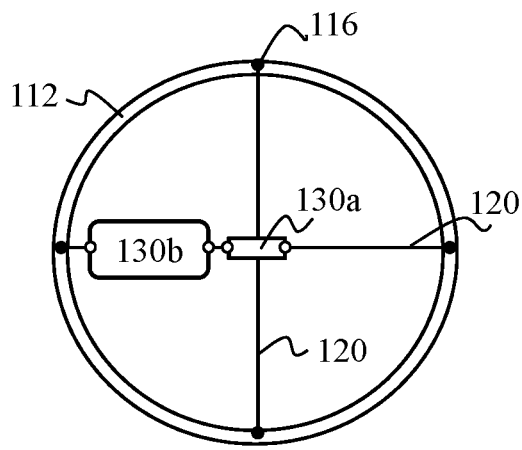
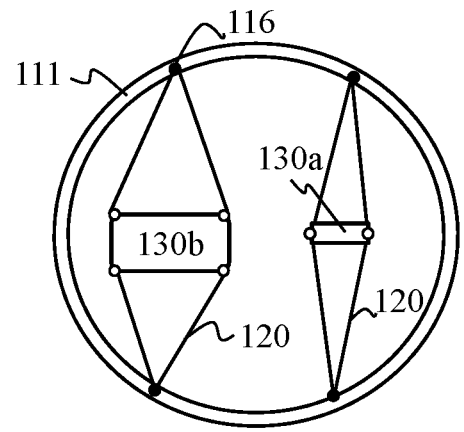
Fig. 4　　　　　　　　　Fig. 5
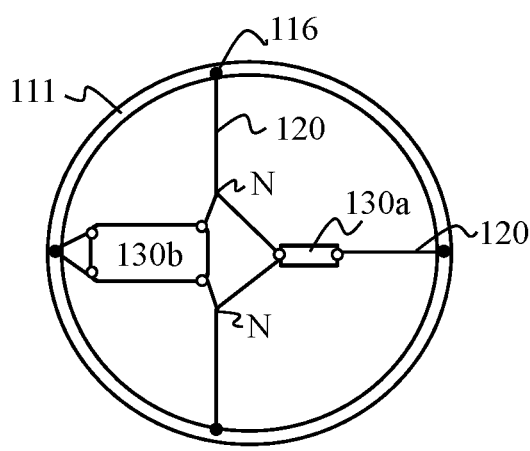
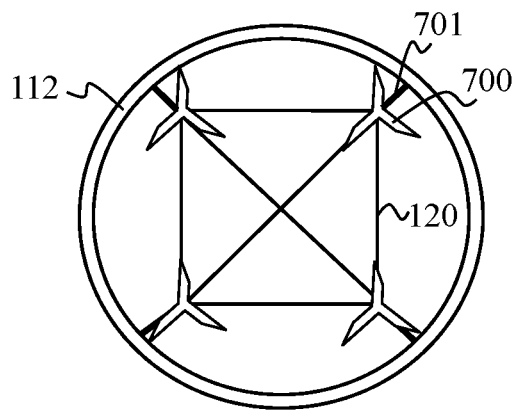
Fig. 6　　　　　　　　　Fig. 7

DRONE CHASSIS

TECHNICAL FIELD

The present invention relates to the field of drones and more particularly the field of drone chassis intended to protect the drone and the environment thereof in the event of impact and to provide stability of functional elements associated with the drone.

PRIOR ART

Drones are being used for more and more numerous applications and are therefore caused to encounter varied obstacles. Consequently a drone may be subjected to impacts of variable intensity according to the flight situations and the potential obstacles present in the environment of the drone. Such impacts have the consequence of damaging the drone, whether structurally by damaging the chassis or functionally by degrading functional elements such as a flight map, a battery or motors. Impacts between the drone and external objects may furthermore cause human and physical damage in the environment of the drone.

Some drones have a rigid structure that makes it possible to withstand high impact speeds by absorbing a large amount of energy by plastic deformation. However, such drones do not make it possible to limit the damage caused to their environment. Other drones with a less rigid structure withstand low impact speeds by elastic absorption of energy. On the other hand, such structures may lack stability.

It is therefore desirable to overcome these drawbacks of the prior art.

It is in particular desirable to provide a solution that makes it possible to protect the drone and its environment during impacts at various speeds and therefore for variable impact forces. It is furthermore desirable to provide a solution that is lightweight. It is also desirable to provide a solution that affords stable holding of the functional elements of a drone in normal flight situations and thus guarantees optimum operation of the drone.

DISCLOSURE OF THE INVENTION

One object of the present invention is to propose a drone chassis comprising an external structure that deforms elastically in bending, and furthermore comprising a set of cables connecting at least one support, intended to support a functional element of the drone, to the external structure. The set of cables comprises elastic cables that deform elastically in traction under a tensile stress above a threshold, referred to as the natural tensile deformation threshold. The set of cables is attached at several points on the external structure, referred to as attachment points, to hold the at least one support in a stable position with respect to the external structure. The elastic cables are attached under stress by applying, to said elastic cables, an initial tensile stress, and maintaining the initial tensile stress by attaching to the external structure so that an external force applied to the chassis and generating an additional tensile stress on the elastic cables attached under stress causes a deformation under traction of the cables and a bending deformation of the external structure only if said additional tensile stress exceeds a minimum tensile deformation threshold that is above the natural tensile deformation threshold of the elastic cables.

Thus the drone chassis withstands low impact speeds without deformation of the external structure while remaining lightweight. Functional elements of the drone can be held in a stable position during collisions at low impact speeds corresponding to normal flight situations. Furthermore, the drone chassis withstands higher impact speeds by converting kinetic energy into elastic energy or by plasticising on the cables, which makes it possible to protect both the drone and its environment by reducing the amplitude of the impact forces.

According to a particular embodiment, the set of cables comprises elastic cables made from high-density polyethylene.

According to a particular embodiment, a cross section of each elastic cable in the set of cables is determined for reducing an elastic limit of the elastic cables and favouring plastic deformation of said cables when an additional tensile stress applied to the elastic cables attached under stress, and generated by the external force applied to the chassis, is above the minimum tensile deformation threshold of said elastic cables attached under stress.

Thus absorption by plasticising of the kinetic energy received by the drone chassis during an impact is favoured compared with conversion into elastic energy, thus limiting transmission of the kinetic energy to the support and thus making it possible to protect the functional elements of the drone. According to a particular embodiment, the external structure of the drone chassis comprises two arches, a first arch being located in a plane orthogonal to a second arch, the first arch being in a vertical plane and the second arch being in a horizontal plane when the drone is in a stabilised flight position. The attachment points to which the at least one support is attached are located on one and the same arch.

Thus an initial tensile stress can easily be applied and maintained on the elastic cables to which the support is attached.

According to a particular embodiment, the set of cables comprises cables oriented in several directions.

Thus the drone chassis can withstand external forces applied to the external structure in various directions and therefore at impacts with obstacles coming from various directions.

According to a particular embodiment, a support comprises a flight map, and each cable in the set of cables has a given length for holding the support comprising the flight map at the centre of the external structure.

Thus the flight map is held in a position favouring optimum guidance of the drone.

According to a particular embodiment, each cable in the set of cables has a given length for centring, with respect to the external structure, a centre of gravity of a set of the functional elements supported by the at least one support.

Thus the equilibrium of the drone chassis is promoted, which affords better control of the movements and therefore of the guidance of the drone.

According to a particular embodiment, the set of cables connects a plurality of supports to the external structure, each support being connected to the external structure by a subset of the set of cables independently of another support.

Thus it is possible to limit the transmission of a movement of a functional element, caused by a conversion into elastic energy on a subset of cables, to another functional element.

According to a particular embodiment, the set of cables comprises a subset of cables connecting the at least one support to two attachment points of the external structure, the subset of cables comprising two pairs of cables, each pair of cables connecting one of the two attachment points to the support, and the subset of cables being arranged so that, for each pair of cables, a first cable in the pair of cables connects an attachment point to a first point of the support and a second cable in said pair of cables connects the same attachment point to a second point of the support different from the first point of the support.

Thus an initial tensile stress can easily be applied and maintained on the elastic cables to which the support is attached.

According to a particular embodiment, the set of cables comprises a subset of cables that connects, between two attachment points, several supports aligned with each other and aligned with said two attachment points.

Thus it is easy to adjust the initial tensile stress to each cable in the subset of cables when the subset of cables is attached to the second attachment point.

According to a particular embodiment, the set of cables connects the at least one support to six attachment supports of the second arch by six distinct cables, the six distinct cables comprising three upper cables connecting the support to respectively three first attachment points, the first attachment points being located at the upper part of the second arch and distributed over the circumference of the arch, and three lower cables connecting the support to respectively three second attachment points, each second attachment point being located on the second arch below a first attachment point.

According to a particular embodiment, the drone chassis supports at least four motor units each comprising a motor and a propeller, each motor unit being attached to the external structure by a rigid rod, and wherein the set of cables comprises a cable connecting each motor unit to each other motor unit.

Thus the external structure is stiffened by means of the cables connecting the motor units, which makes it possible to avoid deformation during impact at low speeds, but keeps deformability during impacts at high speeds making it possible to reduce the impact force both on the drone and on its environment.

According to a particular embodiment, electric wires are passed inside cables in the set of cables for electrically connecting functional elements together.

Thus the functional elements can be electrically connected together by means of a shortest possible routing of the electric wires, thus making it possible to limit an addition of mass to the drone chassis.

The invention also relates to a drone comprising a drone chassis mentioned above in any one of the embodiments thereof.

BRIEF DESCRIPTION OF THE DRAWINGS

The features of the invention mentioned above, as well as others, will emerge more clearly from the reading of the following description of at least one example embodiment, said description being made in relation to the accompanying drawings, among which:

FIG. 4 illustrates schematically a view in cross section, along a second cutting plane, of a part of the drone chassis, the chassis comprising a set of cables for holding a plurality of supports according to a second embodiment;

FIG. 5 illustrates schematically a view in cross section, along the first cutting plane, of a part of the drone chassis, the chassis comprising a set of cables for holding a plurality of supports according to a third embodiment;

FIG. 6 illustrates schematically a view in cross section, along the first cutting plane, of a part of the drone chassis, the chassis comprising a set of cables for holding a plurality of supports according to a fourth embodiment;

FIG. 7 illustrates schematically in plan view a part of the drone chassis, with the set of cables of the drone chassis connecting four motors each connected to a propeller;

DETAILED DISCLOSURE OF EMBODIMENTS

Figure 1:
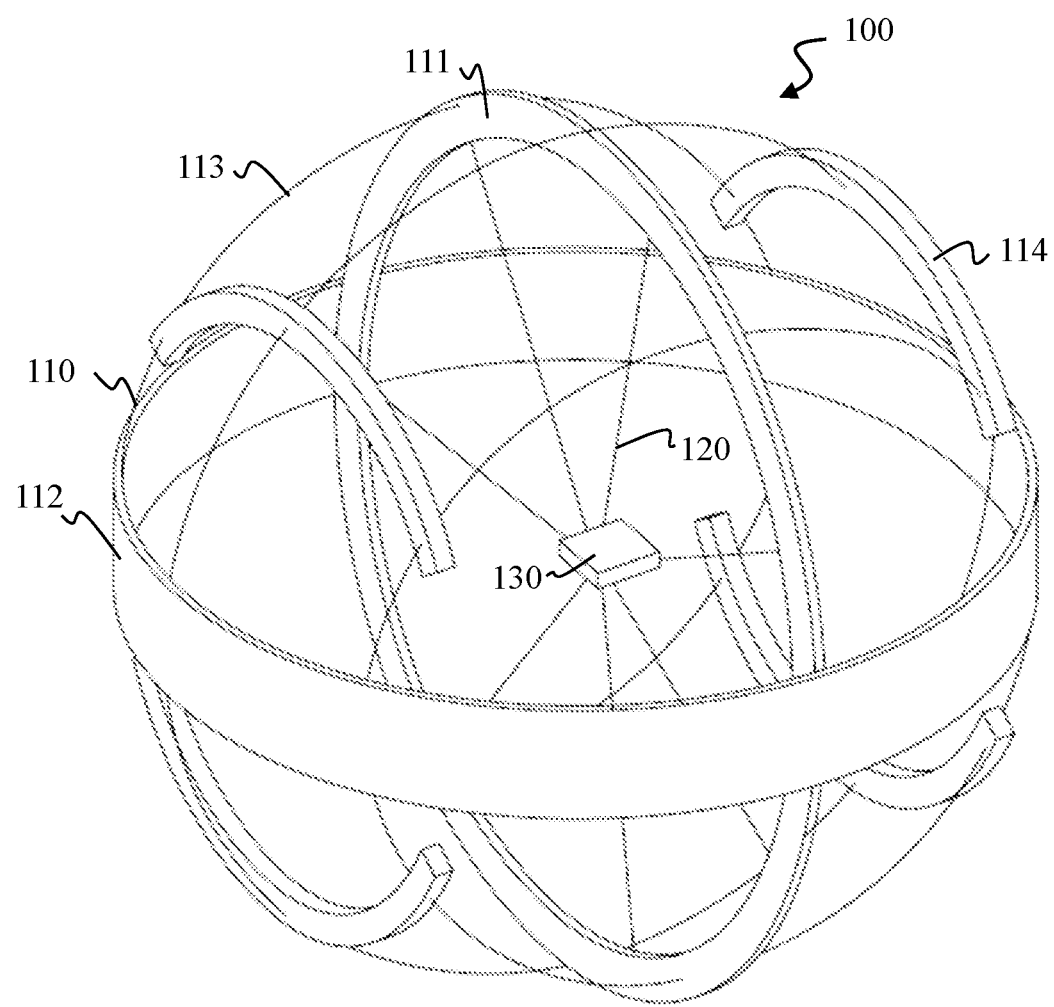
FIG. 1 illustrates schematically a drone according to a particular embodiment.

FIG. 1 thus illustrates schematically a drone 100 according to a particular embodiment. The drone 100 comprises a chassis comprising an external structure 110.

The external structure 110 is for example in the form of a cage. In the embodiment shown in FIG. 1, the external structure 110 comprises a first arch 111 and a second arch 112, protective crescents 114 and wires 113 for connecting the arches 111, 112 and the protective crescents 114 to each other. The first arch 111 is located in a plane orthogonal to the second arch 112. When the drone 100 is in a stabilised flight position as shown in FIG. 1, the first arch 111 is in a vertical plane and the second arch 112 is in a horizontal plane.

The external structure 110 is elastic under bending. In other words, the external structure 110 deforms reversibly when it is subjected to a bending stress that exceeds a first predefined threshold, referred to as the minimum bending deformation threshold of the external structure 110, and regains its repose shape when the bending stress once again goes below said minimum bending deformation threshold of the external structure 110. When the external structure 110 is subjected to a bending stress that exceeds a second predefined threshold referred to as the bending elastic limit of the external structure 110, said external structure 110 deforms plastically, in other words irreversibly, and does not regain its repose shape when the bending stress once again goes below the minimum bending deformation threshold of the external structure 110. The bending elasticity of the external structure 110, in the event of impact, causes bending deformations that are elastic and therefore reversible. Furthermore, the bending elastic deformations of the external structure 110 caused by an impact extend a duration of contact between the external structure 110 and an obstacle. An impact force is thus distributed over a longer period of contact, which causes a reduction in the amplitude of the impact force. The bending elastic deformations of the external structure 110 moreover cause an increase in a contact surface area between said external structure 110 and the obstacle encountered. The energy transmitted during the impact is then distributed over a larger surface area, causing a local reduction in a force peak and therefore a reduction in a stress applied by the impact force, both on the drone and on an obstacle.

The ability of the external structure 110 to deform elastically under bending thus makes it possible, by favouring reversible deformations and reducing the bending stresses applied to the external structure 110, on the one hand to limit damage to the external structure 110 and on the other hand to limit any damage that may be caused to obstacles in the environment of the drone such as objects or persons.

The external structure 110 comprises elements produced with lighter composite materials, having a higher bending elastic limit and thus making it possible to produce thinner parts than metallic materials for example. The external structure 110 thus has limited mass. Obtaining thinner parts, thus comprising less material, furthermore makes it possible to increase the bending deformability of the external structure 110.

An element of the external structure 110 such as an arch 111, 112, a protective crescent 114 or a wire 113 is advantageously curved in order to avoid zones liable to concentrate stresses. Furthermore, curved shapes make it possible to limit the mass of the external structure 110 and the quantity of material used. Thus the external structure 110 may for example have an ellipsoidal shape or a trefoil shape.

The drone chassis 100 furthermore comprises a set of cables 120 for holding one or more functional elements inside the internal structure 110. A functional element is for example a flight map, a battery, one or more motors with propeller, a camera or an effector such as a sensor intended to make measurements, a product to be deposited, a parcel to be transported or a gripper dedicated to sampling. The set of cables 120 connects at least one support 130 intended to support a functional element on the external structure 110. A support 130 is for example a housing or a securing plate. A cable 120 may alternatively be a flexible bar, a wire, a textile link or a rope.

The set of cables 120 is arranged for holding the support 130 in a stable position with respect to the external structure 110, whatever the orientation of the drone chassis 100 and as long as the external structure 110 remains in an initial geometric configuration. The set of cables 120 is attached at several points of the external structure 110, referred to as attachment points 116. The cables 120 are attached to the attachment points by rope connections such as knots, splices, inserts or thimbles.

At least some of the cables 120 in the set of cables 120 is elastic under traction. An elastic cable 120 deforms reversibly by extending when it is subjected to a tensile stress that exceeds a third predefined threshold referred to as the natural tensile deformation of the elastic cable 120 and regains its repose shape when the tensile stress once again goes below the natural deformation threshold of the elastic cable 120. When the elastic cable 120 is subjected to a tensile stress that exceeds a fourth predefined threshold, referred to as the tensile elastic limit of said elastic cable 120, the elastic cable 120 deforms plastically and does not regain its repose shape when the bending stress once again goes below the natural tensile deformation threshold of the elastic cable 120. An elastic cable 120 is for example a high-density polyethylene rope. According to other examples, an elastic cable 120 is a rope made from poly(p-phenylene-2,6-benzobisoxazole) or PBO, from carbon, from polyester, from polyamide, from latex or from polyurethane.

The elastic cables 120 in the set of cables 120 are furthermore attached under stress to the external structure 110. A so-called initial tensile stress is applied to said elastic cables 120 and maintained by attaching to the external structure 110. In other words, an elastic cable 120 or a subset of elastic cables 120 is attached under tension between at least two attachment points 116 of the external structure 110 so that said elastic cable 120 or set of elastic cables 120 remains elastically stretched as long as the external structure 110 remains in its initial geometric configuration. The initial geometric configuration of the external structure 110 corresponds to a geometric configuration in which the set of cables 120 is totally attached to the external structure 110, the elastic cables 120 being stressed under traction, and for which no external force is applied to the drone chassis 100. The initial geometric configuration of the external structure 110 is therefore for example obtained in a stable flight situation. The elastic cables 120 attached under stress in the set of cables 120 make it possible, under identified flight situations, to hold the support 130 in a stable position with respect to the external structure 110.

Electric wires can furthermore be passed inside the cables 120 to electrically connect various functional elements to each other and as short as possible. For example, the motors can be electrically connected to the flight map and to the battery while limiting the mass of the drone 100.

Figures 2A, 2B:
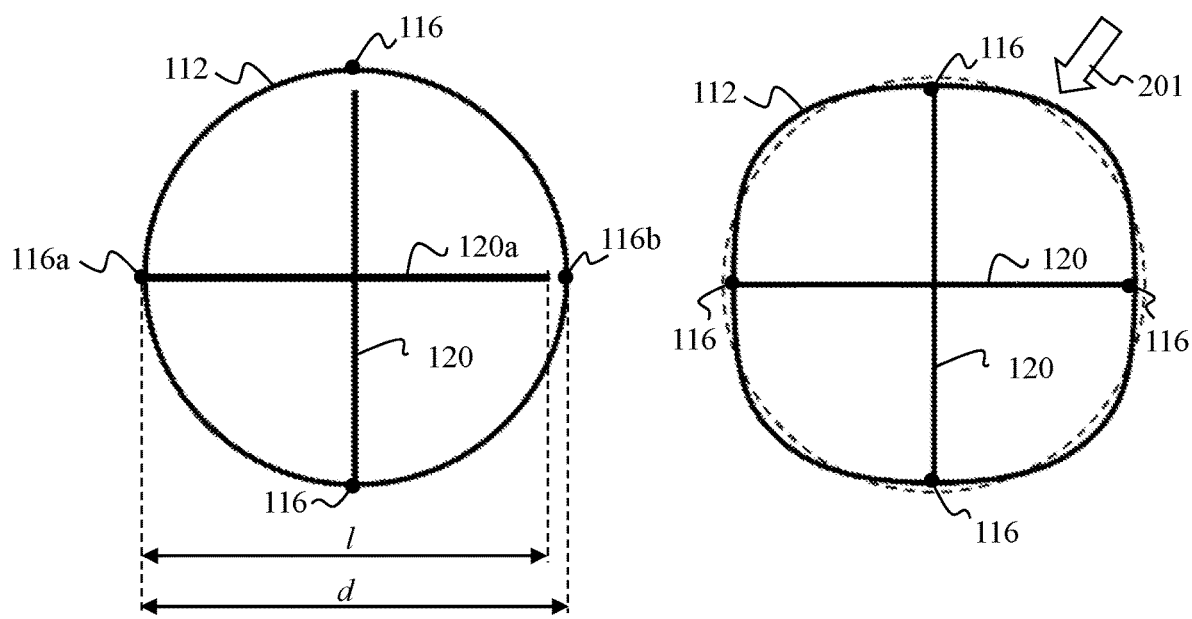
FIG. 2A illustrates schematically a part of a drone chassis with a set of cables when the cables are not completely attached to an external structure.
FIG. 2B illustrates schematically a part of the drone chassis with a set of cables when the cables are completely attached to the external structure.

FIG. 2A illustrates schematically a part of the drone chassis 100 with a set of cables 120 when the cables 120 are not completely attached to an external structure 110. The part of the drone chassis 100 thus shown comprises the second arch 112 of the external structure 110 and two electric cables 120 in the set of cables 120 in a configuration where said elastic cables 120 are partially attached to the external structure 110. In said configuration, the external structure 110 is subjected to a zero stress and is therefore in its repose shape, different from a geometric shape that the external structure 110 of the drone chassis 100 adopts when the drone 100 is in a stabilised flight situation.

In order to apply an initial tensile stress to each elastic cable 120, a length l of a cable 120 is less than a distance d between two attachment points 116 that the cable 120 is supposed to connect. The length l of a cable 120 is defined under zero deformation, in other words when the cable 120 is at repose or is not elastically stretched, and between two ends supposed to connect said two attachment points 116. The distance d between said two attachment points 116 is a defined minimum distance under zero stress, when the external structure 110 is in is repose shape and is not attached to the set of cables 120.

For example, the cable 120a has a length under zero deformation l that is less than the distance d under zero stress between two attachment points 116a and 116b that said cable 120a is supposed to connect after attachment.

FIG. 2B illustrates schematically a part of the drone chassis 100 with a set of cables 120 when the cables 120 are completely attached to the external structure. The part of the drone chassis 100 thus shown comprises the second arch 112 of the external structure 110 and two elastic cables 120 in the set of cables 120 in a configuration where said cables 120 are completely attached to the external structure 110. The external structure 110 is then in its initial geometric configuration, which corresponds to the geometric shape that the external structure 110 of the drone chassis 100 adopts when the drone 100 is in a stabilised flight situation and which differs slightly from the repose shape of the external structure 110.

When the elastic cable 120 of length l under zero deformation is attached to the external structure 110, between two attachment points separated by the distance d under zero stress, greater than said length 1, a first effect is to apply an initial tensile stress to the elastic cable 120 that causes an elastic stretching of said elastic cable 120. The elastic cable 120 is thus attached under stress and kept elastically stretched in the initial geometric configuration of the external structure 110. A second effect is elastically deforming under bending at least a part of the external structure 110, such as for example the second arch 112, and giving to the external structure 110 its initial geometric configuration.

When the drone 100 is used, the chassis may be subjected to an external force that is applied to the external structure 110. If the external force is oriented in a direction transverse to that of a cable 120 such as for example an external force in a direction 201, the cable 120 in question is stressed under traction and therefore subjected to an additional tensile stress. Because of the initial tensile stress applied, an elastic cable 120 attached under stress then has a behaviour that is modified compared with an elastic cable 120 that is similar but that is not attached under initial tensile stress and subjected to a tensile stress identical to said additional tensile stress. Firstly, the elongation of the elastic cable 120 attached under stress generated by the additional tensile stress is limited and therefore lower in amplitude. Moreover, the elastic cable 120 attached under initial tensile stress begins to deform when the additional tensile stress to which it is subjected is above a minimum tensile deformation threshold, said minimum tensile deformation threshold being above the natural tensile deformation threshold of the elastic cable 120.

The initial tensile stress of the elastic cables 120 thus makes it possible to limit the bending elastic deformation of the external structure 110 and to limit the movement of the support 130. In other words, the initial tensile stress of the cables 120 makes it possible to increase the stiffness of the external structure 110.

Furthermore, as long as the additional tensile stress applied to an elastic cable 120 attached under stress is below the minimum tensile deformation threshold, said elastic cable 120 keeps an initial length. It is then possible to maintain the support 130 in a stable position with respect to the external structure 110, which guarantees optimum operation of the functional elements supported by the support 130. In addition, the initial geometric configuration of the external structure 110 can be kept when the chassis is subjected to an external force below a predefined fifth threshold. The predefined fifth threshold is dependent on the first and second predefined bending stress thresholds of the external structure 110, and on the orientation of the external force with respect to the orientation of the elastic cables 120 attached under stress in the set of cables 120, and increases with the initial tensile stress applied to the elastic cables 120 attached under stress.

The initial tensile stress applied to an elastic cable 120 in the set of cables 120 can be adjusted by modifying the parameters of the cable 120 such as the length l under zero deformation of the cable 120, the cross section under zero deformation of the cable 120 and/or the elastic limit of the cable 120. It is thus possible to adapt the minimum tensile deformation threshold of the cables 120 by taking account of potential external forces that may be applied to the external structure 110 in flight situations identified as normal, such as for example during landing or takeoff. Furthermore, geometric parameters of the drone chassis 100 can be adjusted by taking account of the directions of the potential external forces. In a particular embodiment, the elastic cables 120 attached under stress are oriented in several directions so as to withstand external forces applied to the external structure 110 in various directions. Thus the initial geometric configuration of the external structure 110 can be preserved in normal flight situations.

Figure 3:
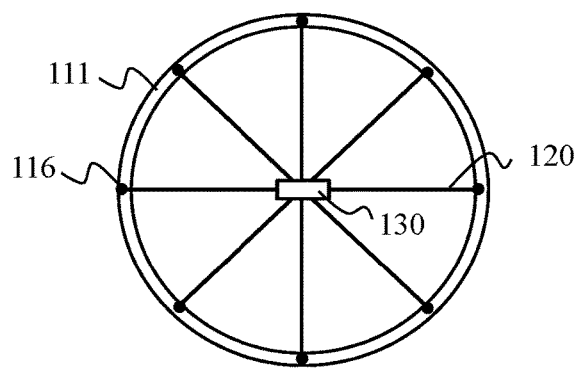
FIG. 3 illustrates schematically a view in cross section, along a first cutting plane, of a part of the drone chassis, the chassis comprising a set of cables for holding a support according to a first embodiment.

FIG. 3 illustrates schematically a view in cross section, along a first cutting plane, of a part of the drone chassis comprising the first vertical arch 111 and the set of cables 120 arranged according to a first embodiment. The first cutting plane is located in the mid-plane of the drone chassis 100 and along a vertical plane when the drone 100 is in a stabilised flight position. The set of cables 120 comprises eight cables 120 each connecting the support 130 located at the centre of the first arch 111 to an attachment point 116 of the first arch 111. The attachment points 116 are regularly distributed over the first arch 111 so that their barycentre is located at the centre of the first arch 111. The cables 120 are grouped together in pairs. The cables 120 in each pair are aligned and oriented in the same direction and each connect the support 130 to an attachment point 116. Each pair of cables 120 thus connects two opposite attachment points 116 on the first arch 111.

In an alternative embodiment, not shown, the set of cables 120 may comprise an odd number of cables 120, each cable connecting an attachment point 116 of the first arch 111 to the support 130.

The attachment points 116 of the set of cables are regularly distributed over the first arch 111 so that their barycentre is located at the centre of the first arch 111. Thus the distribution in space of the various orientations of the cables 120 makes it possible to oppose, in an equivalent manner, external forces applied with various directions.

The set of cables 120 may, according to other embodiments, be in the form of a lattice, net or trellis.

In the event of lateral impact on the chassis, an external force applied by an obstacle on one side of the first arch 111 generates an additional tensile stress on the elastic cables 120 attached under stress. Said elastic cables 120 attached under stress then oppose the bending deformation of the external structure 10. If, for each elastic cable 120 attached under stress in the set of cables 120, the additional tensile stress is below the minimum tensile deformation threshold of the cable 120, the support 130 is maintained in a stable position with respect to the external structure 110, and the external structure 110 keeps its initial geometric configuration.

If, for at least one cable 120 in the set of cables 120, the additional tensile stress is above the minimum tensile deformation threshold of the cable 120, the at least one cable 120 is stretched elastically. The stability of the support 130 and the initial geometric configuration of the external structure 110 are not preserved. On the other hand, part of the kinetic energy transmitted to the chassis is converted into elastic energy. The impact force suffered by the chassis is reduced at the support 130 by spring effect because of the elasticity of said cable 120. It is possible to adjust the stiffness of the cables 120 in order to limit the deformation of the support 130 in the event of impact.

If, for at least one cable 120 in the set of cables 120, the additional tensile stress is above the minimum tensile deformation threshold and above the elastic limit of the cable 120, the at least one cable 120 furthermore suffers plastic deformation. Part of the kinetic energy transmitted to the chassis is thus absorbed by plasticising of the at least one cable 120 and is then not transmitted to the support 130. Said support 130 is thus protected from the impacts. In such a case, the at least one cable 120 is damaged and must be replaced for further use of the drone 100.

The set of cables 120 can be sized to reduce the elastic limit of the elastic cables 120, for example by reducing the cross section of the elastic cables 120, in order to reduce an interval between the minimum tensile deformation threshold of the elastic cables 120 attached under stress and the elastic limit of the elastic cables 120. Thus, when an external force applied has an excessively high amplitude for the support 130 to be maintained in its initial geometric configuration by virtue of the initial tensile stress of the cables 120, the case where the kinetic energy transmitted to the chassis is partially absorbed by plasticising is favoured.

FIG. 4 illustrates schematically a view in cross section, along a second cutting plane, of a part of the drone chassis comprising the second arch 112 of the external structure 110 and the set of cables 120 arranged in a second embodiment. The second cutting plane is located in the mid-plane of the drone chassis 100 and along a horizontal plane when the drone 100 is in a stabilised flight position.

The set of cables 120 comprises a first cable connecting two opposite attachment points 116 on the second arch 112, thus forming a diameter of the second arch 112. The set of cables 120 furthermore comprises a subset of cables 120 aligned with each other, in a direction perpendicular to the direction of the first cable. A cable 120 in the subset of cables 120 connects a first attachment point 116 of the second arch 112 to a first support 130a, a cable 120 in the subset of cables 120 connects the first support 130a to a second support 130b, and a cable in the subset of cables connects the second support 130b to a second attachment point 116 opposite to the first attachment point 116.

Said subset of cables 120 can thus connect, in one and the same alignment, two distinct functional elements such as the flight map and the battery. The cables 120 in the subset of cables can be sized to adjust the position of the functional elements supported by the supports 130a and 130b according to their respective masses. Thus it is for example possible to position, at the centre of the second arch 112, the centre of gravity of the set of functional elements so as to balance the drone 100.

FIG. 5 illustrates schematically a view in cross section, along the first cutting plane, of a part of the drone chassis comprising the first vertical arch 111 of the external structure 110 and the set of cables 120 arranged according to a third embodiment. The set of cables 120 comprises two subsets of cables 120. Each support 130a (and respectively 130b) is connected to the first arch 111 by a subset of cables 120 independently of another support 130b (and respectively 130b).

Each support 130a, 130b is connected to two attachment points 116, a first attachment point 116, referred to as the upper attachment point 116, being located above and vertically in line with a second attachment point 116, referred to as the lower attachment point 116. Thus the support 130a, 130b is held between an upper attachment point 116, located above, and a lower attachment point 116, located below.

Each support 130a, 130b is furthermore connected to each of its attachment points 116 by a pair of cables 120. A first cable 120 in each pair of cables 120 connects a first point of the support 130a, 130b to an attachment point 116, and a second cable 120 in said pair of cables 120 connects a second point of the support 130a, 130b to the same attachment point 116. Thus said attachment point 116 and the first and second points of the support 130a, 130b form a triangle.

In the example of a thin first support 130a, the upper pair of cables 120 is connected to first and second points of the second support 130b that are identical to the first and second points on the second support 130b to which the lower pair of cables is connected. In the example of a thicker second support 130b, the upper pair of cables 120 is connected to first and second points on the second support 130b that are different from the first and second points on the second support 130b to which the lower pair of cables is connected.

The two attachment points 116 to which the first support 130a is connected are distinct from the two attachment points 116 to which the second support 130b is connected. Thus the two supports 130a, 130b are located at distinct positions and do not come into contact.

In the event of a lateral impact on the chassis, and if the additional tensile stress applied to the elastic cables 120 attached under stress is above the minimum tensile deformation threshold of the cables 120, the cables 120 are stretched elastically. The support 130a, 130b is then driven in a lateral movement in a direction opposite to that of the force applied by inertia effect with respect to the external structure 110 and then returns to an initial position by spring effect. The impact is thus damped at the support 130a, 130b because of the elasticity of the cables 120. If the additional tensile stress is above the elastic limit of the cables 120, the cables 120 furthermore suffer plastic deformation making it possible to at least partially absorb the kinetic energy transmitted to the chassis and to damp the impact at the support 130a, 130b.

In the case of a vertical impact on the chassis, for example when the drone 100 falls onto the ground, the cables 120 being located between two attachment points 116 in the same direction as that of a force applied to the drone chassis 100, there is no tensile stress on all the cables 120. Said cables 120 relax and do not oppose the bending deformation of the external structure 110. When the external structure 110 comes into contact with the ground, the support 130a, 130b is driven, because of its inertia, in a downward vertical movement with respect to the external structure 110. Such a downward vertical movement of the support 130a, 130b generates an overtension on the upper cables 120 attached to the upper attachment point 116 and a relaxation of the lower cables 120 attached to the lower attachment point 116. At least some of the kinetic energy transmitted to the chassis is converted into elastic energy stored in the cables 120 that have remained under tension, in other words in the upper cables 120, which makes it possible to reduce the inertia forces at the support 130a, 130b. If the impact force is such that the overtension on the upper cables 120 is above the tensile elastic limit of the cables 120, at least part of the kinetic energy transmitted to the chassis is furthermore absorbed plastically by the cables 120. The impact is damped at the support 130a, 130b but the cables 120 must be replaced for further use of the drone 100.

FIG. 6 illustrates schematically a view in cross section, along the first cutting plane, of a part of the drone chassis comprising the first arch 111 of the external structure 110 and the set of cables 120 arranged according to a fourth embodiment.

The set of cables 120 connects two supports 130a and 130b. A first cable 120 connects a first attachment point 116 of the first arch 111 to the first support 130a. A pair of two cables connects a second attachment point 116, opposite to the first attachment point 116 on the first arch 111, to two points on the second support 130b. The two supports 130a and 130b are furthermore connected together and to a third and fourth attachment point 116 by two groups of three cables 120, referred to as star-shaped groups. For each star-shaped group, the three cables 120 are connected together by a node N. A first cable 120 in the star-shaped group connects the node N to a point on the first support 130a. A second cable 120 in the star-shaped group connects the node N to a point on the second support 130b. A third cable 120 in the star-shaped group connects the node N to an attachment point 116. The star-shaped groups make it possible to reduce the total length of the cables 120 connecting the supports 130*a*, 130*b* to an arch 111.

The third and fourth attachment points 116 form an alignment perpendicular to an alignment formed by the first and second attachment points 116. Furthermore, the third and fourth attachment points 116 are located in a vertical alignment when the drone 100 is in a stable position.

In order to apply an initial tensile stress to the cables 120 configured according to the fourth embodiment, it suffices to stretch, towards the first attachment point 116, the first cable 120 connected to the first support 130*a*. A tension exerted on the first cable 120 is transferred to the whole of the set of cables 120.

The cables 120 located between the third and fourth attachment points 116 have a tendency to oppose the bending deformation of the external structure 110 at the time of a lateral impact on the drone 100.

The cables 120 located between the first and second attachment points 116 have a tendency to oppose the bending deformation of the external structure 100 at the time of a vertical impact on the drone.

FIG. 7 illustrates schematically in plan view a part of the drone chassis comprising the second arch 112 and a set of cables 120 connecting four motor assembles 700, each motor assembly comprising a motor and a propeller. A motor assembly 700 is disposed inside the external structure 110. The external structure 110 thus protects the motor assemblies 700 and propeller from damage during an external impact. Furthermore, the external structure 110 makes it possible to avoid a propeller becoming attached on an external object during a flight and makes it possible to protect the environment of the drone 100.

Each motor assembly 100 is supported by the external structure 110 by means of one or more rigid rods 701 and is furthermore connected to each of the other motor assemblies 700 by a set of cables 120. The set of cables 120 thus comprises six cables 120 each connecting two motor assemblies 700. According to one embodiment, the motor assemblies 700 are arranged in a square in one and the same plane and the cables 120 form the sides and the diagonals of the square.

Figure 8:
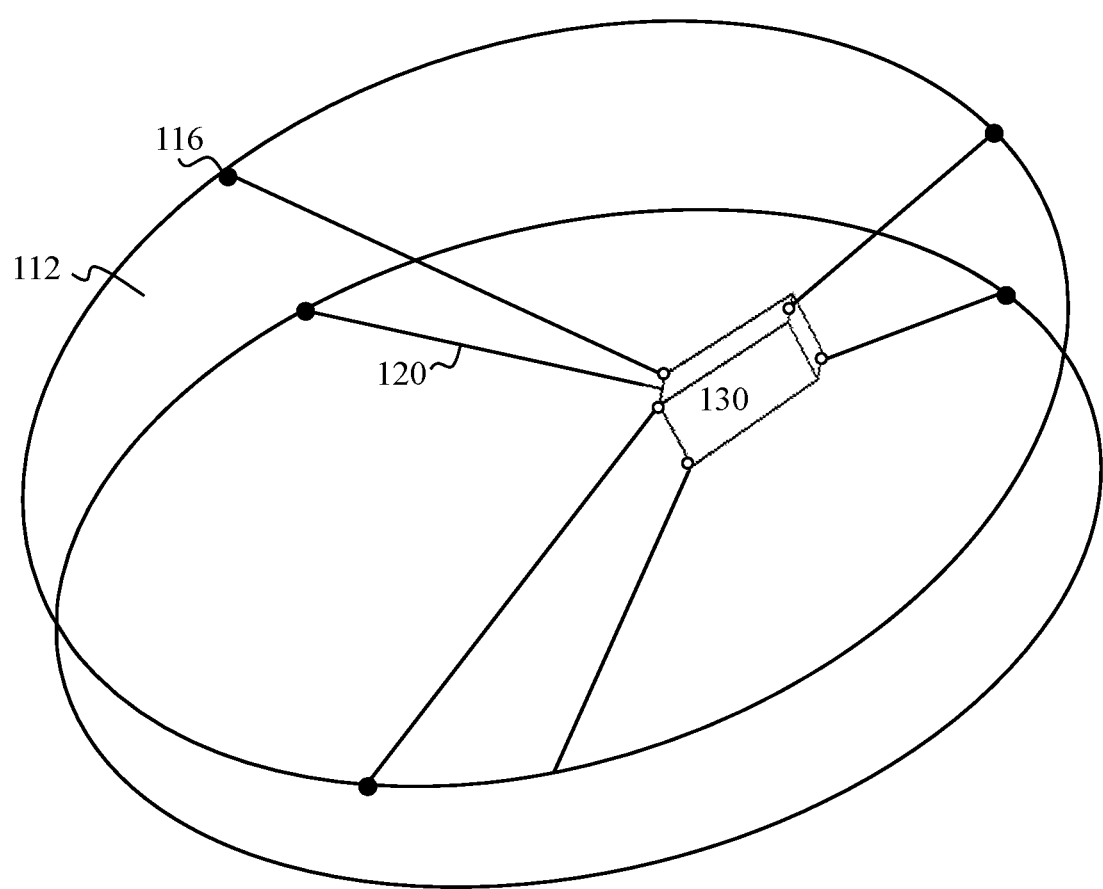
FIG. 8 illustrates schematically in perspective a part of the drone chassis with a set of cables making it possible to hold a support according to a fifth embodiment.

FIG. 8 illustrates schematically in perspective a part of the drone chassis comprising the second horizontal arch 112, with a set of cables 120 making it possible to hold a support 130 according to a fifth embodiment. The support 130 is connected to six attachment points 116 of the second arch 112 by six distinct cables 120. Three upper cables 120 are attached to three first attachment points 116 located in the upper part of the second arch 112 and distributed over the circumference of the arch 112. Three lower cables 120 are attached to three second attachment points 116 located on the second arch 112 below respectively the three first attachment points 116.

In the event of an impact of the chassis on the ground, for example when the drone 100 falls, the support 130 is driven downwards because of its inertia. The downward vertical movement of the support 130 causes an overtension on the upper cables 120 and a relaxation of the lower cables 120. Part of the kinetic energy transmitted to the chassis is therefore absorbed or stored elastically by the upper cables 120, which protects the support 130 by reducing the impact force.

The invention claimed is:

1. A drone chassis, comprising an external structure that deforms elastically in bending, and furthermore comprising a set of cables connecting at least one support to the external structure, wherein the at least one support is configured to support a functional element of the drone, the set of cables comprising elastic cables that deform elastically in traction under a tensile stress above a threshold, referred to as the natural tensile deformation threshold, the set of cables being attached at several points on the external structure, referred to as attachment points, to hold the at least one support in a stable position with respect to the external structure, wherein the elastic cables are attached under stress by applying, to said elastic cables, an initial tensile stress, and by maintaining the initial tensile stress by attaching to the external structure so that an external force applied to the chassis and generating an additional tensile stress on the elastic cables attached under stress causes a deformation under traction of the cables and a bending deformation of the external structure only if said additional tensile stress exceeds a minimum tensile deformation threshold that is above the natural tensile deformation threshold of the elastic cables.

2. The drone chassis according to claim 1, wherein the set of cables comprises elastic cables made from high-density polyethylene.

3. The drone chassis according to claim 1, wherein a cross section of each elastic cable in the set of cables is determined for reducing an elastic limit of the elastic cables and favouring plastic deformation of said cables when an additional tensile stress applied to the elastic cables attached under stress, and generated by the external force applied to the chassis, is above the minimum tensile deformation threshold of said elastic cables attached under stress.

4. The drone chassis according to claim 1, wherein the external structure comprises two arches, a first arch being located in a plane orthogonal to a second arch, the first arch being in a vertical plane and the second arch being in a horizontal plane when the drone is in a stabilised flight position, and wherein the attachment points to which the at least one support is attached are located on one and the same arch.

5. The drone chassis according to claim 1, wherein the set of cables comprises cables oriented in several directions.

6. The drone chassis according to claim 1, wherein a first support comprises a flight map, and wherein each cable in the set of cables has a given length for holding the first support comprising the flight map at the centre of the external structure.

7. The drone chassis according to claim 1, wherein each cable in the set of cables has a given length for centring, with respect to the external structure, a centre of gravity of a set of the functional elements supported by the at least one support.

8. The drone chassis according to claim 1, wherein the set of cables connects a plurality of supports to the external structure, each support being connected to the external structure by a subset of the set of cables independently of another support.

9. The drone chassis according to claim 1, wherein the set of cables comprises a subset of cables connecting the at least one support to two attachment points of the external structure, the subset of cables comprising two pairs of cables, each pair of cables connecting one of the two attachment points to the support, and the subset of cables being arranged so that, for each pair of cables, a first cable in the pair of cables connects an attachment point to a first point of the support and a second cable in said pair of cables connects the same attachment point to a second point of the support different from the first point of the support.

10. The drone chassis according to claim 1, wherein the set of cables comprises a subset of cables that connects, between two attachment points, several supports aligned with each other and aligned with said two attachment points.

11. The drone chassis according to claim 4, wherein the set of cables connects the at least one support to six attachment points of the second arch by six distinct cables, the six distinct cables comprising three upper cables connecting the support to respectively three first attachment points, the first attachment points being located at the upper part of the second arch and distributed over the circumference of the arch, and three lower cables connecting the support to respectively three second attachment points, each second attachment point being located on the second arch below a first attachment point.

12. The drone chassis according to claim 1, wherein the chassis supports at least four motor units each comprising a motor and a propeller, each motor unit being attached to the external structure by a rigid rod, and wherein the set of cables comprises a cable connecting each motor unit to each other motor unit.

13. The drone chassis according to claim 1, wherein electric wires are passed inside cables in the set of cables for electrically connecting functional elements together.

14. A drone comprising the drone chassis according to claim 1.

* * * * *